UNITED STATES PATENT OFFICE.

EDWARD W. HASLUP, OF BRONXVILLE, NEW YORK, ASSIGNOR TO HASLUP & PEACOCK, INC., OF NEW YORK, N. Y., A CORPORATION OF NEW YORK.

PROCESS OF MAKING CALCIUM CYANAMID AND BY-PRODUCTS FROM PHOSPHATE-ROCK.

1,281,363. Specification of Letters Patent. Patented Oct. 15, 1918.

No Drawing. Application filed December 15, 1917. Serial No. 207,274.

*To all whom it may concern:*

Be it known that I, EDWARD W. HASLUP, a citizen of the United States, residing at Bronxville, in the county of Westchester and State of New York, have invented certain new and useful Improvements in Processes of Making Calcium Cyanamid and By-Products from Phosphate-Rock; and I do hereby declare the following to be a full, clear, and exact description of the invention, such as will enable others skilled in the art to which it appertains to make and use the same.

This invention relates to a process of making oxids of phosphorus and calcium cyanamid from phosphate rock and producer gas, and has for its object to improve the methods and lessen the costs of the procedures heretofore proposed.

With these and other objects in view the invention consists in the novel steps and combinations of steps constituting the invention, all as will be more fully hereinafter disclosed and particularly pointed out in the claims.

In carrying out the invention, there is provided a finely divided mixture of phosphate rock and carbon in excess, and said mixture is heated in a suitable furnace in the presence of a stream of producer gas to a temperature sufficient to liberate the phosphorus. Such temperature will lie between 1200° C. and 1600° C. according to the furnace used, the degree of fine division of the charge, and other factors well known to the skilled furnace man.

The main reaction may be represented by the following equation:—

(a) $Ca_3P_2O_8 + 5C = 3CaO + 5CO + 2P$ 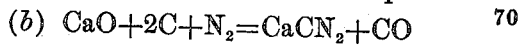

The excess of carbon in the charge serves to form carbon monoxid with the oxygen present in the phosphate rock, and to form a carbid with the calcium also present in said rock. The effect, when considered in connection with the stream of producer gas, is to thoroughly impregnate the interstices of the rock with a reducing atmosphere, and thus effectually exclude free oxygen which would be fatal to the process. And, further, since the combined oxygen of the rock as well as the combined calcium thereof are simultaneously attacked, the phosphate molecule is readily broken down at the temperatures employed, so that the free nitrogen of the producer gas readily combines with a portion of the calcium and carbon present to form the desired calcium cyanamid all as will presently appear.

That is to say, in practice it is found that the phosphorus will not only be evolved in the elemental state, but it will also come off in the form of oxids. The rock being thus decomposed and the furnace containing calcium oxid, (CaO) and free carbon in a highly heated condition, I continue to stream producer gas through the charge while raising the temperature to 1500° C. and above, when the following main reaction takes place.

(b) $CaO + 2C + N_2 = CaCN_2 + CO$ 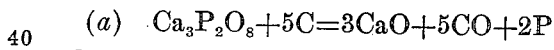

Should any phosphorus remain in the charge it will now go off in an elemental state and in the form of oxids along with the calcium cyanamid, $(CaCN_2)$ thus produced, which latter is chiefly in the form of a sublimate. This said cyanamid mixed with the exit gases may be passed through a suitable separator and recovered as a product while the exit gases consisting of carbon monoxid, CO, free nitrogen, and more or less phosphorus, is along with the phosphorus and oxids of phosphorus first evolved, burnt under suitable boilers or other heat conservers to recover their heats of combustion and to produce phosphorus pentoxid $P_2O_5$ as a second product.

It will be observed that by following the procedure just outlined, a great economy in heat units is effected, for the phosphate rock and carbon being already heated to a high temperature when the first mentioned phosphorus is expelled, it requires comparatively a small quantity of additional heat to react upon the calcium oxid with the nitrogen present in the producer gas. And further, it will now be clear that since not only all the carbon monoxid of the producer gas is utilized including that produced by equations (a) and (b) either in the furnace or under the boilers, the process is unusually economical in its requirements of heat units that are supplied to the process.

It is obvious that those skilled in the art may vary the details of the process without departing from the spirit of the invention, and therefore, I do not wish to be limited to the above disclosure except as may be required by the claims.

What I claim is:—

1. The process of making calcium cyanamid from phosphate rock and producer gas which consists in providing a finely divided mixture of said rock and carbon in excess; heating said mixture to a temperature in the presence of said gas sufficient to drive off substantially all the phosphorus present; and raising the temperature of the residue in the presence of said gas, sufficiently to form calcium cyanamid, substantially as described.

2. The process of making calcium cyanamid from phosphate rock and producer gas which consists in providing a finely divided mixture of said rock and an excess of carbon; heating said mixture to a temperature above 1200° C. in the presence of said gas, and to a point sufficient to drive off substantially all the phosphorus present; and raising the temperature of the residue in the presence of said gas sufficiently to form calcium cyanamid, substantially as described.

3. The process of making calcium cyanamid from phosphate rock which consists in finely dividing said rock; mixing the finely divided rock with carbon in excess; raising the mixture to a temperature of substantially 1200° C. while streaming producer gas through the same, to drive off the phosphorus present and to produce calcium oxid in the residue; raising the temperature to substantially 1500° C. while still streaming producer gas through said residue to form calcium cyanamid; and suitably recovering said cyanamid, substantially as described.

4. The process of making calcium cyanamid and phosphorus pentoxid from phosphate rock which consists in finely dividing said rock; mixing the finely divided rock with carbon in excess; raising the mixture to a temperature of substantially 1200° C. while streaming producer gas through the same, to drive off the phosphorus present and to produce calcium oxid in the residue; raising the temperature to substantially 1500° C. while still streaming producer gas through said residue to form calcium cyanamid; burning the phosphorus and oxids of phosphorus thus produced to form phosphorus pentoxid, and recovering the same; and suitably recovering said cyanamid, substantially as described.

In testimony whereof I affix my signature in presence of two witnesses.

EDWARD W. HASLUP.

Witnesses:
MARY C. WALSH,
E. M. CAHILL.